United States Patent [19]

Ooi

[11] Patent Number: 5,239,660
[45] Date of Patent: Aug. 24, 1993

[54] VECTOR PROCESSOR WHICH CAN BE FORMED BY AN INTEGRATED CIRCUIT OF A SMALL SIZE

[75] Inventor: Yasushi Ooi, Tokyo, Japan

[73] Assignee: NEC Corporation, Tokyo, Japan

[21] Appl. No.: 784,509

[22] Filed: Oct. 30, 1991

[30] Foreign Application Priority Data

Oct. 31, 1990 [JP] Japan .................................. 2-296081

[51] Int. Cl.⁵ .......................................... G06F 15/347
[52] U.S. Cl. ............................. 395/800; 364/DIG. 1; 364/232.21; 364/931.51
[58] Field of Search .................. 364/DIG. 1, DIG. 2; 395/800, 375, 200, 700

[56] References Cited

U.S. PATENT DOCUMENTS 4,302,818 11/1981 Niemann .............................. 395/275

OTHER PUBLICATIONS

Computer Architecture and Parallel Processing, Hwang et al., McGraw-Hill, pp. 263-271.

*Primary Examiner*—Robert B. Harrell
*Attorney, Agent, or Firm*—Whitham & Marhoefer

[57] ABSTRACT

In a vector calculation unit (31), a multiplication and an addition result register (50 and 53) are connected to a pipeline multiplier (14) and a pipeline adder (15), respectively. A multiplication and an addition result bus (52 and 55) are connected to the multiplication and the addition result registers, respectively. A selector (S1) connects one of an input bus (11) and the multiplication and the addition result buses to the first operand register to which a first multiplication and a first addition operand bus (44 and 45') are connected. A selector (S2) connects one of another input bus (12) and the multiplication and the addition result buses to the second operand register to which second multiplication and second addition operand buses (48 and 49) are connected. A selector (S3) connects one of the first multiplication operand, the multiplication result, and the addition result buses to an input of the multiplier. A selector (S4) connects one of the second multiplication operand, the multiplication result, and the addition result buses to another input of the multiplier. A selector (S5) connects one of the first addition operand, the multiplication result, and the addition result buses to an input of the adder. A selector (S6) connects one of the second addition operand, the multiplication result, and the addition result buses to another input of the adder. A selector (S7) connects one of the first addition operand, the second addition operand, the multiplication result, and the addition result buses to an output bus (13).

6 Claims, 8 Drawing Sheets

VECTOR PROCESSOR WHICH CAN BE FORMED BY AN INTEGRATED CIRCUIT OF A SMALL SIZE

BACKGROUND OF THE INVENTION

This invention relates to a vector processor for carrying out vector calculations in accordance with floating-point arithmetic.

A vector processor of the type described, generally has a first and a second processor input bus and a processor output bus. The first and the second processor input buses are supplied with a first and a second input vector, each of which has a plural number of vector components or elements. The vector processor is for calculating a calculation result of a vector calculation in accordance with floating-point arithmetic in response to the first and the second input vectors. The processor output bus is for supplying the calculation result to an external device.

The vector processor comprises a vector calculation unit and a control unit for controlling the vector calculation unit.

The vector calculation unit comprises a pipeline multiplier, a pipeline adder, and first through fourth vector registers. The pipeline multiplier is for calculating a multiplication result of floating-point multiplication in a multiplier pipeline fashion in response to first and second multiplier input operands. The pipeline adder is for calculating an addition result of floating-point addition in a multiplier pipeline fashion in response to first and second adder input operands. For example, such a vector calculation unit is disclosed by Kai Hwang et al in a book "Computer Architecture and Parallel Processing", International student edition, published 1985 by MacGraw-Hill Book Company, pages 264-271, under the heading of "4.4.1 The Architecture of Cray-1".

As will later be described in detail, the pipeline multiplier of the vector calculation unit has a multiplier output terminal connected to a multiplication result bus. The first through the fourth vector registers has register input terminals which are operatively connected to the multiplication result bus through first through fourth selectors, respectively. Likewise, the pipeline adder has an adder output terminal connected to an addition result bus. The register input terminals of the first through the fourth vector registers are operatively connected to the addition result bus through the first through the fourth selectors, respectively. Each of the first through the fourth selectors is furthermore connected to at least one of the first and the second processor input buses and selects one of the multiplication result bus, the addition result bus, and the processor input bus as a selected bus to connect the selected bus to the register input terminal of the vector register in question.

Attention will be directed to a case where the vector calculation unit is implemented by the use of an IC (integrated circuit) or an LSI (large scale integration circuit). Inasmuch as the multiplier output terminal of the pipeline multiplier is operatively connected to all of the first through the fourth vector registers and as the adder output terminal of the pipeline adder is operatively connected to all of the first through the fourth vector registers, connection lines unavoidably occupy a large area on a semiconductor chip in order to operatively connect the multiplier output terminal of the pipeline multiplier to all of the first through the fourth vector registers and to operatively connect the adder output terminal of the pipeline adder to all of the first through the fourth vector registers. This results in a high cost on manufacturing the vector processor.

SUMMARY OF THE INVENTION

It is therefore an object of this invention to provide a vector processor which has a simple structure.

It is another object of this invention to provide a vector processor of the type described, which can be formed by an IC or an LSI of a small size.

It is still another object of this invention to provide a vector processor of the type described, which has a low cost.

Other objects of this invention will become clear as the description proceeds.

On describing the gist of an aspect of this invention, it is possible to understand that a vector processor has a first and as second processor input bus and a processor output bus. The first and the second processor input buses are supplied with a first and a second input vector. The vector processor is for calculating a calculation result of a vector calculation in accordance with floating-point arithmetic in response to the first and the second input vectors. The processor output bus is for supplying the calculation result to an external device. The vector processor comprises a vector calculation unit and a control unit for controlling the vector calculation unit.

According to this aspect of this invention, the vector calculation unit comprises in the above-mentioned vector processor; a first operand vector register having a first operand register input terminal and a first operand register output terminal, the first operand register input terminal being supplied with a first register input operand, the first operand vector register being for memorizing the first register input operand as a first memorized operand to supply the first memorized operand to the first operand register output terminal; a first operand bus connected to the first operand register output terminal to be supplied with the first memorized operand; a second operand vector register having a second operand register input terminal and a second operand register output terminal, the second operand register input terminal being supplied with a second register input operand, the second operand vector register being for memorizing the second register input operand as a second memorized operand to supply the second memorized operand to the second operand register output terminal, a second operand bus connected to the second operand register output terminal to be supplied with the second memorized operand; a pipeline multiplier having a first and a second multiplier input terminal and a multiplier output terminal, the first and the second multiplier input terminals being supplied with a first and a second multiplier input operand, the pipeline multiplier being for calculating a multiplication result of floating-point multiplication in a multiplier pipeline fashion in response to the first and the second multiplier input operands to supply the multiplication result to the multiplier output terminal, a multiplication result vector register having a multiplication register input terminal and a multiplication register output terminal, the multiplication register input terminal being connected to the multiplier output terminal, the multiplication result vector register being for memorizing the multiplication result as a memorized multiplication result to supply the memorized multiplication result to the multiplication register output terminal; a multiplication result bus connected to the multiplication register output terminal to be supplied with the memorized multiplication result; a pipeline adder having a first and a second adder input terminal and an adder output terminal, the first and the second adder input terminals being supplied with a first and a second adder input operand, the pipeline adder being for calculating an addition result of floating-point addition in a multiplier pipeline fashion in response to the first and the second adder input operands to supply the addition result to the adder output terminal; an addition result vector register having an addition register input terminal and an addition register output terminal, the addition register input terminal being connected to the adder output terminal, the addition result vector register being for memorizing the addition result as a memorized addition result to supply the memorized addition result to the addition register output terminal; an addition result bus connected to the addition register output terminal to be supplied with the memorized addition result; a first selector connected to the first processor input bus, the multiplication result bus, the addition result bus, and the first operand register input terminal for carrying out a first selecting operation of one of the first input vector, the memorized multiplication result, and the memorized addition result as a first selected operand to supply the first selected operand to the first operand register input terminal as the first register input operand; a second selector connected to the second processor input bus, the multiplication result bus, the addition result bus, and the second operand register input terminal for carrying out a second selecting operation of one of the second input vector, the memorized multiplication result, and the memorized addition result as a second selected operand to supply the second selected operand to the second operand register input terminal as the second register input operand; a third selector connected to the first operand bus, the multiplication result bus, the addition result bus, and the first multiplier input terminal or carrying out a third selecting operation of one of the first memorized operand, the memorized multiplication result, and the memorized addition result as a third selected operand to supply the third selected operand to the first multiplier input terminal as the first multiplier input operand; a fourth selector connected to the second operand bus, the multiplication result bus, the addition result bus, and the second multiplier input terminal for carrying out a fourth selecting operation of one of the second memorized operand, the memorized multiplication result, and the memorized addition result as a fourth selected operand to supply the fourth selected operand to the second multiplier input terminal as the second multiplier input operand; a fifth selector connected to the first operand bus, the multiplication result bus, the addition result bus, and the first adder input terminal for carrying out a fifth selecting operation of one of the first memorized operand, the memorized multiplication result, and the memorized addition result as a fifth selected operand to supply the fifth selected operand to the first adder input terminal as the first adder input operand; a sixth selector connected to the second operand bus, the multiplication result bus, the addition result bus, and the second adder input terminal for carrying out a sixth selecting operation of one of the second memorized operand, the memorized multiplication result, and the memorized addition result as a sixth selected operand to supply the sixth selected operand to the second adder input terminal as the second adder input operand; and a seventh selector connected to the first and the second operand buses, the multiplication result bus, the addition result bus, and the processor output bus for carrying out a seventh selecting operation of one of the first and the second memorized operands, the memorized multiplication result, and the memorized addition result as the calculation result to supply the calculation result to the processor output bus. The control unit is connected to the first through the seventh selectors to control the first through the seventh selecting operations.

On describing the gist of a different aspect of this invention, it is possible to understand that a vector processor has a first and a second primary processor input bus, a first and a second subsidiary processor input bus, and a processor output bus. The first and the second primary input buses are supplied with a first and a second primary input vector. The first and the second subsidiary input buses are supplied with a first and a second subsidiary input vector. The vector processor is for calculating a calculation result of vector calculation in accordance with floating-point arithmetic in response to the first and the second primary input vectors and the first and the second subsidiary input vectors. The processor output bus is for supplying the calculation result to an external device. The vector processor comprises a primary and a subsidiary vector calculation unit and a control unit for controlling the primary and the subsidiary vector calculation units.

According to the different aspect of this invention, the primary vector calculation unit comprises in the above-mentioned vector processor; a first primary operand vector register having a first primary operand register input terminal and a first primary operand register output terminal, the first primary operand register input terminal being supplied with a first primary register input operand, the first primary operand vector register being for memorizing the first primary register input operand as a first primary memorized operand to supply the first primary memorized operand to the first primary operand register output terminal; a first primary operand bus connected to the first primary operand register output terminal to be supplied with the first primary memorized operand; a second primary operand vector register having a second primary operand register input terminal and a second primary operand register output terminal, the second primary operand register input terminal being supplied with a second primary register input operand, the second primary operand vector register being for memorizing the second primary register input operand as a second primary memorized operand to supply the second primary memorized operand to the second primary operand register output terminal; a second primary operand bus connected to the second primary operand register output terminal to be supplied with the second primary memorized operand; a primary pipeline multiplier having a first and a second primary multiplier input terminal and a primary multiplier output terminal, the first and the second primary multiplier input terminals being supplied with a first and a second primary multiplier input operand, the primary pipeline multiplier being for calculating a primary multiplication result of floating-point multiplication in a primary multiplier pipeline fashion in response to the first and the second primary multiplier input operands to supply the primary multiplication result to the primary multiplier output terminal; a primary multiplication result vector register having a primary multiplication register input terminal and a primary multiplication register output terminal, the primary multiplication register input terminal being connected to the primary multiplier output terminal, the primary multiplication result vector register being for memorizing the primary multiplication result as a primary memorized multiplication result to supply the primary memorized multiplication result to the primary multiplication register output terminal; a primary multiplication result bus connected to the primary multiplication register output terminal to be supplied with the primary memorized multiplication result; a primary pipeline adder having a first and a second primary adder input terminal and a primary adder output terminal, the first and the second primary adder input terminals being supplied with a first and a second primary adder input operand, the primary pipeline adder being for calculating a primary addition result of floating-point addition in a primary multiplier pipeline fashion in response to the first and the second primary adder input operands to supply the primary addition result to the primary adder output terminal; a primary addition result vector register having a primary addition register input terminal and a primary addition register output terminal, the primary addition register input terminal being connected to the primary adder output terminal, the primary addition result vector register being for memorizing the primary addition result as a primary memorized addition result to supply the primary memorized addition result to the primary addition register output terminal; and a primary addition result bus connected to the primary addition register output terminal to be supplied with the primary memorized addition result.

The subsidiary vector calculation unit comprises int he above-mentioned vector processor; a first subsidiary operand vector register having a first subsidiary operand register input terminal and a first subsidiary operand register output terminal, the first subsidiary operand register input terminal being supplied with a first subsidiary register input operand, the first subsidiary operand vector register being for memorizing the first subsidiary register input operand as a first subsidiary memorized operand to supply the first subsidiary memorized operand to he first subsidiary operand register output terminal; a first subsidiary operand bus connected to the first subsidiary operand register output terminal to be supplied with the first subsidiary memorized operand; a second subsidiary operand register having a second subsidiary operand register input terminal and a second subsidiary operand register output terminal, the second subsidiary operand register input terminal being supplied with a second subsidiary register input operand, the second subsidiary operand vector register being for memorizing the second subsidiary register input operand as a second subsidiary memorized operand to supply the second subsidiary memorized operand to the second subsidiary operand register output terminal; a second subsidiary operand bus connected to the second subsidiary operand register output terminal to be supplied with the second subsidiary memorized operand; a subsidiary pipeline multiplier having a first and a second subsidiary multiplier input terminal and a subsidiary multiplier output terminal, the first and the second subsidiary multiplier input terminals being supplied with a first and a second subsidiary multiplier input operand, the subsidiary pipeline multiplier being for calculating a subsidiary multiplication result of floating-point multiplication in a subsidiary multiplier pipeline fashion in response to the first and the second subsidiary multiplier input operands to supply the subsidiary multiplication result to the subsidiary multiplier output terminal; a subsidiary multiplication result vector register having a subsidiary multiplication register input terminal and a subsidiary multiplication register output terminal, the subsidiary multiplication register input terminal being connected to the subsidiary multiplier output terminal, the subsidiary multiplication result vector register being for memorizing the subsidiary multiplication result as a subsidiary memorized multiplication result to supply the subsidiary memorized multiplication result to the subsidiary multiplication register output terminal; a subsidiary multiplication result bus connected to the subsidiary multiplication register output terminal to be supplied with the subsidiary memorized multiplication result; a subsidiary pipeline adder having a first and a second subsidiary adder input terminal and a subsidiary adder output terminal, the first and the second subsidiary adder input terminals being supplied with a first and a second subsidiary adder input operand, the subsidiary pipeline adder being for calculating a subsidiary addition result of floating-point addition in a subsidiary multiplier pipeline fashion in response to the first and the second subsidiary adder input operands to supply the subsidiary addition result to the subsidiary adder output terminal; a subsidiary addition result vector register having a subsidiary addition register input terminal and a subsidiary addition register output terminal, the subsidiary addition register input terminal being connected to the subsidiary adder output terminal, the subsidiary addition result vector register being for memorizing the subsidiary addition result as a subsidiary memorized addition result to supply the subsidiary memorized addition result to the subsidiary addition register output terminal; and a subsidiary addition result bus connected to the subsidiary addition register output terminal to be supplied with the subsidiary memorized addition result.

The primary vector calculation unit further comprises: a first primary selector connected to the first primary processor input bus, the primary multiplication result bus, the primary addition result bus, and the first primary operand register input terminal for carrying out a first primary selecting operation of one of the first primary input vector, the primary memorized multiplication result, and the primary memorized addition result as a first primary selected operand to supply the first primary selected operand to the first primary operand register input terminal as the first primary register input operand; a second primary selector connected to the second primary processor input bus, the primary multiplication result bus, the primary addition result bus, and the second primary operand register input terminal for carrying out a second primary selecting operation of one of the second primary input vector, the primary memorized multiplication result, and the primary memorized addition result as a second primary selected operand to supply the second primary selected operand to the second primary operand register input terminal as the second primary register input operand; a third primary selector connected to the first primary operand bus, the primary multiplication result bus, the primary addition result bus, and the first primary multiplier input terminal for carrying out a third primary selecting operation of one of the first primary memorized operand, the primary memorized multiplication result, and the primary memorized addition result as a third primary selected operand to supply the third primary selected operand to the first primary multiplier input terminal as the first primary multiplier input operand; a fourth primary selector connected to the second primary operand bus, the primary multiplication result bus, the primary addition result bus, the second subsidiary operand bus, and the second primary multiplier input terminal for carrying out a fourth primary selecting operation of one of the second primary memorized operand, the primary memorized multiplication result, the primary memorized addition result, and the second subsidiary memorized operand as a fourth primary selected operand to supply the fourth primary selected operand to the second primary multiplier input terminal as the second primary multiplier input operand; a fifth primary selector connected to the first primary operand bus, the primary multiplication result bus, the primary addition result bus, the subsidiary multiplication result bus, and the first primary adder input terminal for carrying out a fifth primary selecting operation of one of the first primary memorized operand, the primary memorized multiplication result, the primary memorized addition result, and the subsidiary memorized multiplication result as a fifth primary selected operand to supply the fifth primary selected operand to the first primary adder input terminal as the first primary adder input operand; a sixth primary selector connected to the second primary operand bus, the primary multiplication result bus, the primary addition result bus, and the second primary adder input terminal or carrying out a sixth primary selecting operation for one of the second primary memorized operand, the primary memorized multiplication result, and the primary memorized addition result as a sixth primary selected operand to supply the sixth primary selected operand to the second primary adder input terminal as the second primary adder input and; and a seventh primary selector connected to the first and the second primary operand buses, the primary multiplication result bus, and the primary addition result bus for carrying out a seventh primary selecting operation of one of the first and the second primary memorized operands, the primary memorized multiplication result, and the primary memorized addition result as a primary unit result.

The subsidiary vector calculation unit further comprises: a first subsidiary selector connected to the first subsidiary processor input bus, the subsidiary multiplication result bus, the subsidiary addition result bus, and the first subsidiary operand register input terminal or carrying out a first subsidiary selecting operation of one of the first subsidiary input vector, the subsidiary memorized multiplication result, and the subsidiary memorized addition result as a first subsidiary selected operand to supply the first subsidiary selected operand to the first subsidiary operand register input terminal as the first subsidiary register input operand; a second subsidiary selector connected to the second subsidiary processor input bus, the primary multiplication result bus, the subsidiary addition result bus, and the second subsidiary operand register input terminal or carrying out a second subsidiary selecting operation of one of the second subsidiary input vector, the subsidiary memorized multiplication result, and the subsidiary memorized addition result as a second subsidiary selected operand to supply the second subsidiary selected operand to the second subsidiary operand register input terminal as the second subsidiary register input operand; a third subsidiary selector connected to the first subsidiary operand bus, the subsidiary multiplication result bus, the subsidiary addition result bus, and the first subsidiary multiplier input terminal for carrying out a third subsidiary selecting operation of one of the first subsidiary memorized operand, the subsidiary memorized multiplication result, and the subsidiary memorized addition result as a third subsidiary selected operand to supply the third subsidiary selected operand to the first subsidiary multiplier input terminal as the first subsidiary multiplier input operand; a fourth subsidiary selector connected to the second subsidiary operand bus, the subsidiary multiplication result bus, the subsidiary addition result bus, the second primary operand bus, and the second subsidiary multiplier input terminal for carrying out a fourth subsidiary selecting operation of one of the second subsidiary memorized operand, the subsidiary memorized multiplication result, the subsidiary memorized addition result, and the second primary memorized operand as a fourth subsidiary selected operand to supply the fourth subsidiary selected operand to the second subsidiary multiplier input terminal as the second subsidiary multiplier input operand; a fifth subsidiary selector connected to the first subsidiary operand bus, the subsidiary multiplication result bus, the subsidiary addition result bus, the primary multiplication result bus, and the first subsidiary adder input terminal for carrying out a fifth subsidiary selecting operation of one of the first subsidiary memorized operand, the subsidiary memorized multiplication result, the subsidiary memorized addition result, and the primary memorized multiplication result as a fifth subsidiary selected operand to supply the fifth subsidiary selected operand to the first subsidiary adder input terminal as the first subsidiary adder input operand; a sixth subsidiary selector connected to the second subsidiary operand bus, the subsidiary multiplication result bus, the subsidiary addition result bus, and the second subsidiary adder input terminal for carrying out a sixth subsidiary selecting operation of one of the second subsidiary memorized operand, the subsidiary memorized multiplication result, and the subsidiary memorized addition result as a sixth subsidiary selected operand to supply the sixth subsidiary selected operand to the second subsidiary adder input terminal as the second subsidiary adder input operand; and a seventh subsidiary selector connected to the first and the second subsidiary operand buses, the subsidiary multiplication result bus, and the subsidiary addition result bus for carrying out a seventh subsidiary selecting operation of one of the first and the second subsidiary memorized operands, the subsidiary memorized multiplication result, and the subsidiary memorized addition result as a subsidiary unit result.

The seventh primary and the seventh subsidiary selectors are connected to the processor output bus to supply the primary and the subsidiary unit results collectively as the calculation result to the processor output bus.

The control unit is connected to the first through the seventh primary selectors and the first through the seventh subsidiary selectors to control the first through the seventh primary selecting operations and the first through the seventh subsidiary selecting operations.

DESCRIPTION OF THE PREFERRED EMBODIMENTS

Figure 1:
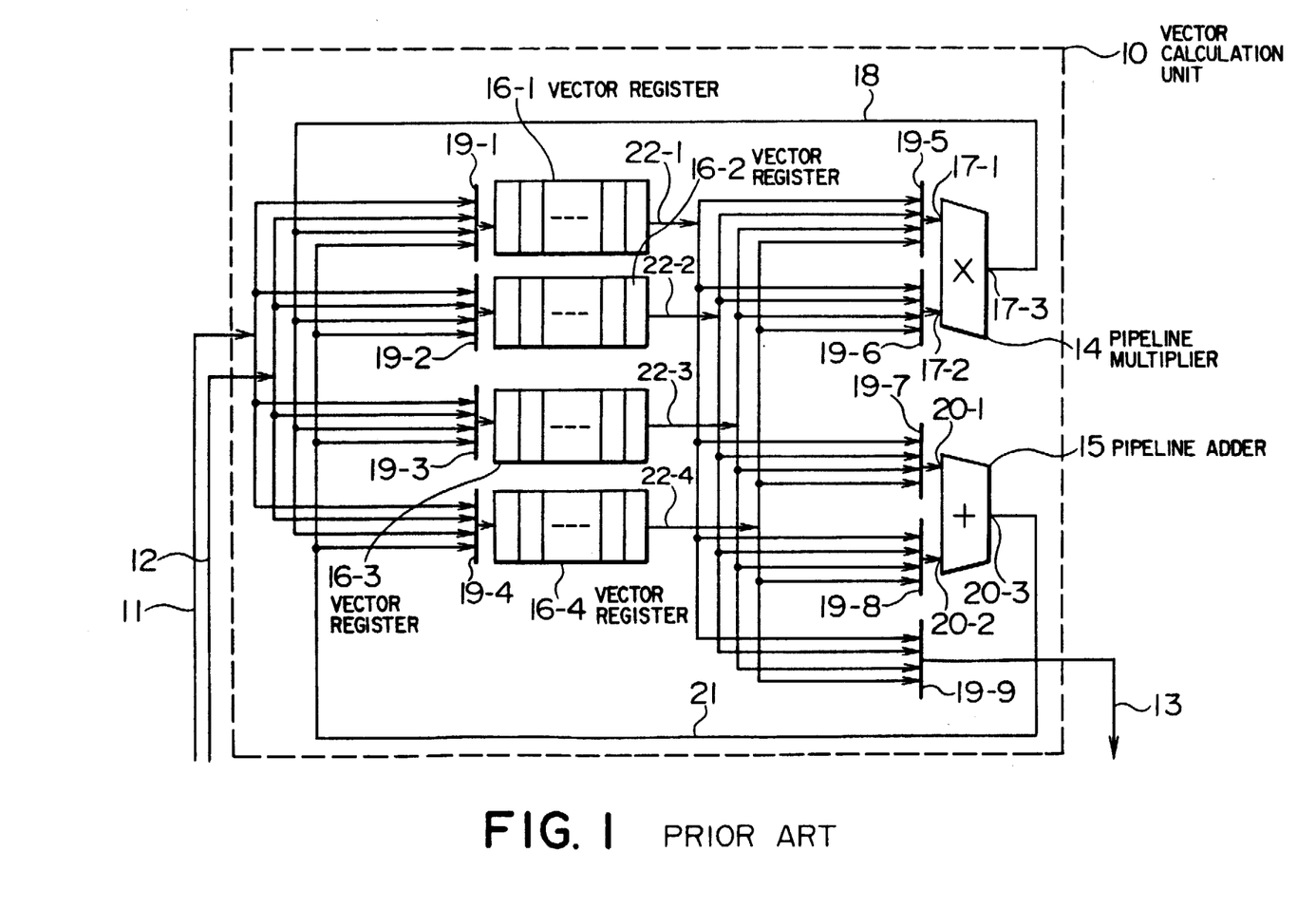
FIG. 1 is a block diagram of a vector calculation unit of a conventional vector processor.

Referring to FIG. 1, a vector calculation unit 10 of a conventional vector processor will be described at first for a better understanding of this invention. The conventional vector processor is equivalent to a vector processor described in the textbook by Kai Hwqang et al., Supra. The vector processor has first and second processor input buses 11 and 12 and a processor output bus 13. The first and the second processor input buses 11 and 12 are supplied with first and second input vectors, each of which has a plural number of vector components or elements. The vector processor is for calculating a calculation result of vector calculation in accordance with floating-point arithmetic in response to the first and the second input vectors. The processor output bus 13 is for supplying the calculation result to an external device (later illustrated).

The vector processor comprises the vector calculation unit 10 and a control unit (later illustrated) for controlling the vector calculation unit 10.

The vector calculation unit 10 comprises a pipeline multiplier 14, a pipeline adder 15, and first through fourth vector registers 16-1 to 16-4. The pipeline multiplier 14 is for calculating a multiplication result of floating-point multiplication in a multiplier pipeline fashion in response to first and second multiplier input operands. The pipeline adder 15 is for calculating an addition result of floating-point addition in a multiplier pipeline fashion in response to first and second adder input operands.

The pipeline multiplier 14 has first and second multiplier input terminals 17-1 and 17-2 and a multiplier output terminal 17-3 connected to a multiplication result bus 18. The first through the fourth vector registers 16-1 to 16-4 has register input terminals which are operatively connected to the multiplication result bus 18 through first through fourth selectors 19-1 to 19-4, respectively.

Likewise, the pipeline adder 15 has first and second adder input terminals 20-1 and 20-2 and an adder output terminal 20-3 connected to an addition result bus 21. The register input terminals of the first through the fourth vector registers 16-1 to 16-4 are operatively connected to the addition result bus 21 through the first through the fourth selectors 19-1 to 19-4, respectively. Each of the first through the fourth selectors 19-1 to 19-4 is furthermore connected to the first and the second processor input buses 11 and 12 and selects one of the multiplication result bus 18, the addition result bus 21, and the first and the second processor input buses 11 and 12 as a selected bus to connect the selected bus to the register input terminal of the vector register in question.

The first through the fourth vector registers 16-1 to 16-4 have register output terminals connected to first through fourth operand buses 22-1 to 22-4. Each of the fifth through the ninth selectors 19-5 to 19-9 selects one of the first through the fourth operand buses 22-1 to 22-4 as another selected bus and connects the other selected bus to one of the first and the second multiplier input terminals 17-1 to 17-2, the first and the second adder input terminals 20-1 and 20-2, and the processor output bus 13.

The control unit is connected to the first through the ninth selectors 19-1 to 19-9 to control selecting operations of the first thorough the ninth selectors 19-1 to 19-9.

As mentioned above, the vector calculation unit 10 is generally implemented by the use of an IC or LSI. Inasmuch as the multiplier output terminal 17-3 of the pipeline multiplier 14 is operatively connected to all of the first through the fourth vector registers 16-1 to 16-4 and as the adder output terminal 20-3 of the pipeline adder 15 is operatively connected to all of the first through the fourth vector registers 16-1 to 16-4, connection lines unavoidably occupy a large area on a semiconductor chip in order to operatively connect the multiplier output terminal 17-3 to all of the first through the fourth vector registers 16-1 to 16-4 and to operatively connect the adder output terminal 20-3 to all of the first through the fourth vector registers 16-1 to 16-4. This makes it difficult to manufacture the vector calculation unit 10 at a low cost.

Figure 2:
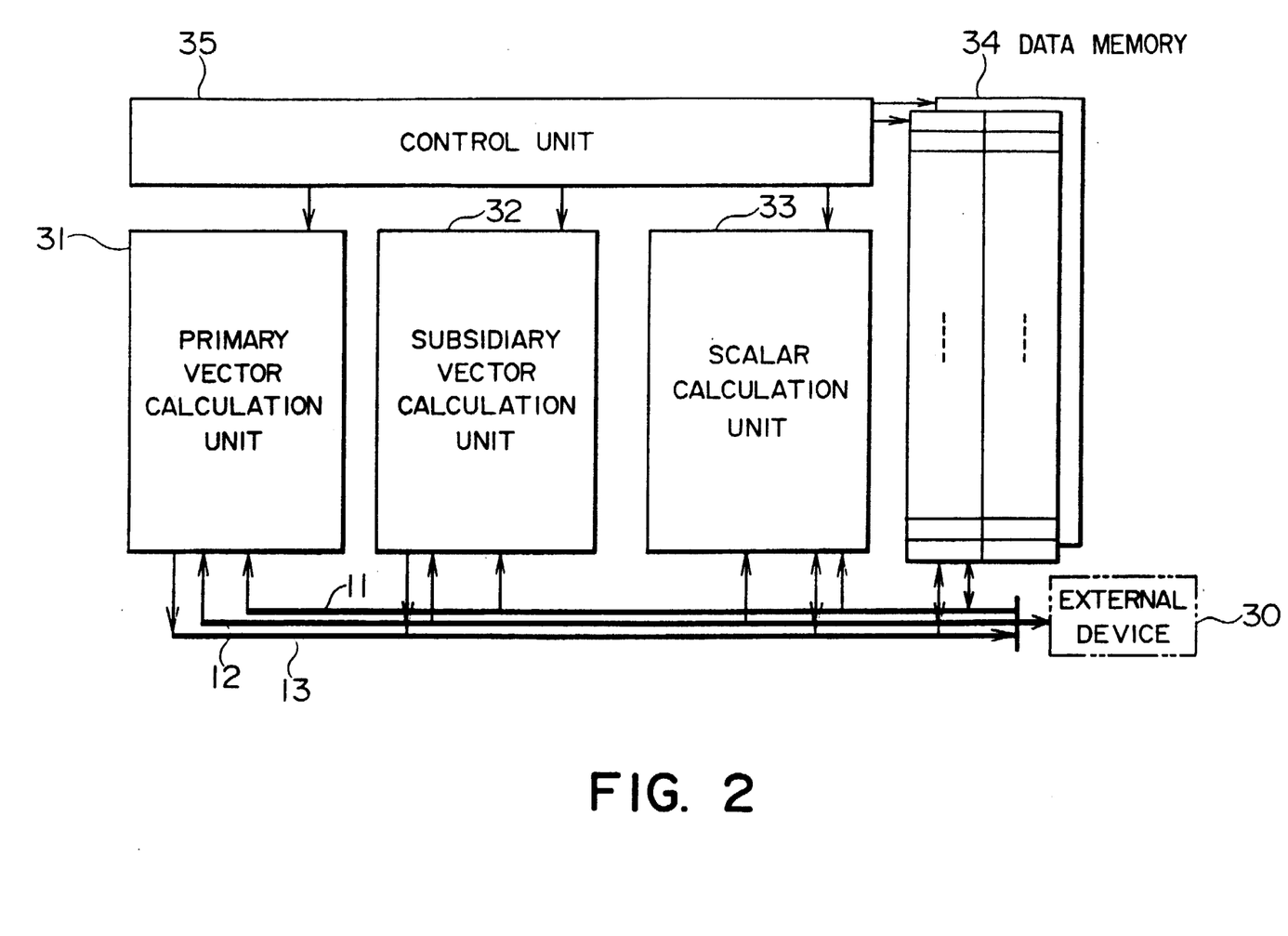
FIG. 2 is a block diagram of a vector processor according to a first embodiment of this invention.

Turning to FIG. 2, a vector processor according to a first embodiment of this invention has first and second processor input buses 11 and 12 and a processor output bus 13. The first and the second processor input buses 11 and 12 are supplied with first and second input vectors, respectively. Each of the first and the second input vectors has a plural number of vector components. The vector processor is for calculating a calculation result of vector calculation in accordance with floating-point arithmetic in response to the first and the second input vectors. The processor output bus 13 is for supplying the calculation result to an external device 30.

The vector processor comprises primary and subsidiary vector calculation units 31 and 32, a scalar calculation unit 33, a data memory 34, and a control unit 35 for controlling the primary and the subsidiary vector calculation units 31 and 32, the scalar calculation unit 33, and the data memory 34 in accordance with a vector instruction which instructs the vector processor to carry out the vector calculation. Although description will be made only as regards the primary vector calculation unit 31, the subsidiary vector calculation unit 32 is similar in structure to the primary vector calculation unit 31. The scalar calculation unit 33 is for calculating a result of scalar calculation. The data memory 34 memorizes the first and the second input vectors and delivers the first and the second input vectors to the first and the second processor input buses 11 and 12 under control of the control unit 35.

Figure 3:
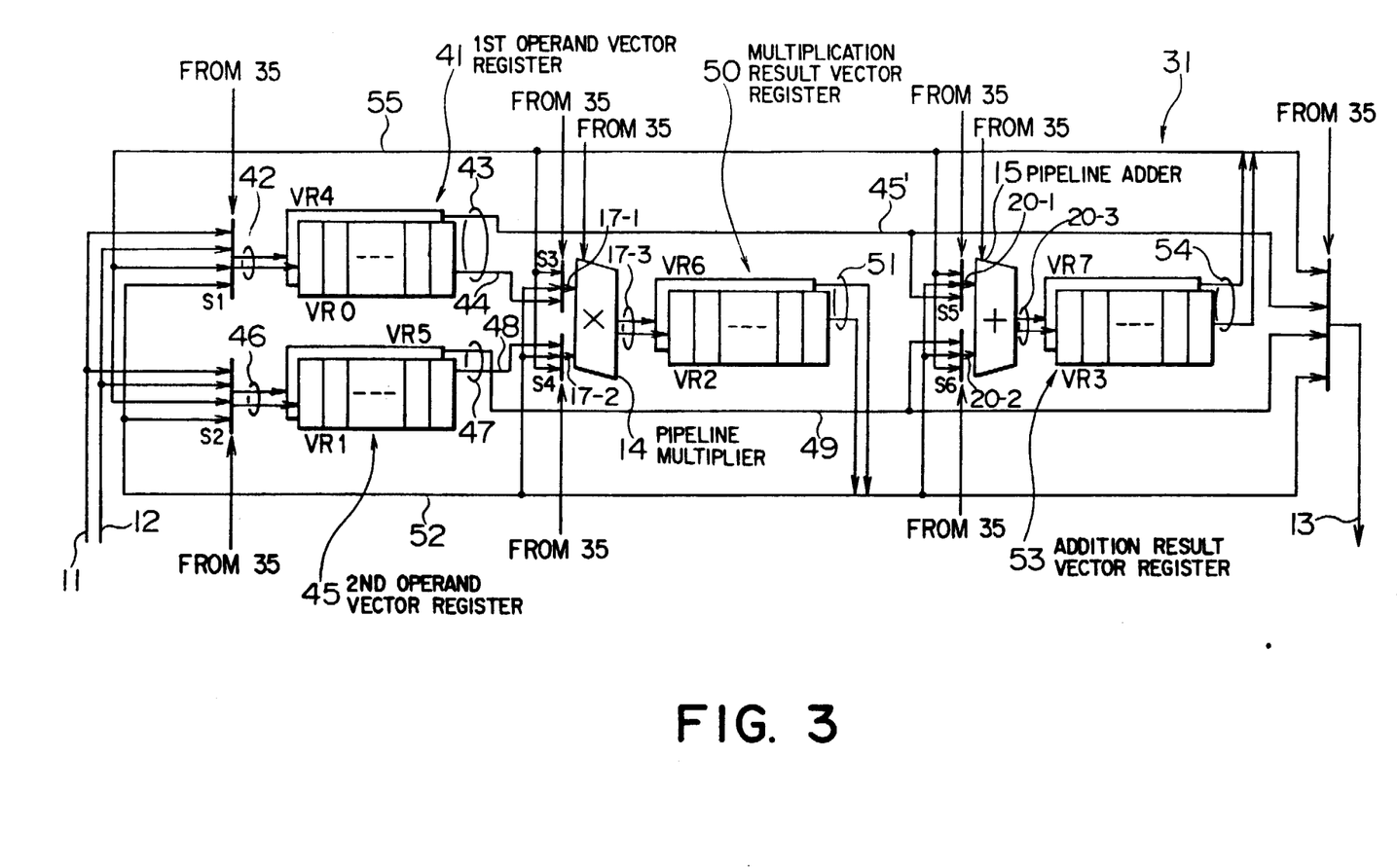
FIG. 3 is a block diagram of a vector calculation unit of the vector processor illustrated in FIG. 1.

Turning to FIG. 3, the primary vector calculation unit 31 comprises a first operand vector register 41 having a first operand register input terminal 42 and a first operand register output terminal 43. The first operand register input terminal 42 is supplied with a first register input operand. The first operand vector register 41 is for memorizing the first register input operand as a first memorized operand to supply the first memorized operand to the first operand register output terminal 43. More specifically, the first operand vector register 41 comprises multiplication and addition operand registers VR0 and VR4 for memorizing multiplication and addition operands, respectively. First multiplication and first addition operand buses 44 and 45' are connected to the multiplication and the addition operand registers VR0 and VR4, respectively. A collection of the first multiplication and the first addition operand buses 44 and 45' is referred to as a first operand bus connected to the first operand register output terminal 43 to be supplied with the first memorized operand.

Likewise, a second operand vector register 45 having a first operand register input terminal 46 and a first operand register output terminal 47. The first operand register input terminal 46 is supplied with a second register input operand. The second operand vector register 45 is for memorizing the first register input operand as a second memorized operand to supply the second memorized operand to the second operand register output terminal 47. More exactly, the second operand vector register 45 comprises multiplication and addition operand registers VR1 and VR5 for memorizing multiplication and addition operands, respectively. Second multiplication and second addition operand buses 48 and 49 are connected to the multiplication and the addition operand registers VR1 and VR5, respectively. A collection of the second multiplication and the second addition operand buses 48 and 49 is referred to as a second operand bus connected to the second operand register output terminal 47 to be supplied with the second memorized operand.

A pipeline multiplier 14 has first and second multiplier input terminals 17-1 and 17-2 and a multiplier output terminal 17-3. The first and the second multiplier input terminals 17-1 and 17-2 are supplied with first and second multiplier input operands. The pipeline multiplier 14 is for calculating a multiplication result of floating-point multiplication in a multiplier pipeline fashion in response to the first and the second multiplier input operands to supply the multiplication result to the multiplier output terminal 17-3.

A multiplication result vector register 50 has a multiplication register input terminal connected to the multiplier output terminal 17-3. The multiplication result vector register 50 has a multiplication register output terminal 51. The multiplication result vector register 50 is for memorizing the multiplication result as a memorized multiplication result to supply the memorized multiplication result to the multiplication register output terminal 51. More specifically, the multiplication result vector register 50 comprises result registers VR2 and VR6.

A multiplication result bus 52 is connected to the multiplication register output terminal 51 to be supplied with the memorized multiplication result. More exactly, the result registers VR2 and VR6 are connected to the multiplication result bus 52 in common.

A pipeline adder 15 has first and second adder input terminals 20-1 and 20-2 and an adder output terminal 20-3. The first and the second adder input terminals 20-1 and 20-2 are supplied with first and second adder input operands. The pipeline adder 15 is for calculating an addition result of floating-point addition in a multiplier pipeline fashion in response to the first and the second adder input operands to supply the addition result to the adder output terminal 20-3.

An addition result vector register 53 has an addition register input terminal connected to the adder output terminal 20-3. The addition result vector register 53 has an addition register output terminal 54. The addition result vector register 53 is for memorizing the addition result as a memorized addition result to supply the memorized addition result to the addition register output terminal 54. More specifically, the addition result vector register 53 comprises result registers VR3 and VR7.

An addition result bus 55 is connected to the addition register output terminal 54 to be supplied with the memorized addition result. More exactly, the result registers VR3 and VR7 are connected to the addition result bus 55 in common.

A first selector S1 is connected to the first and the second processor input buses 11 and 12, the multiplication result bus 52, the addition result bus 55, and the first operand register input terminal 42 for carrying out a first selecting operation of one of the first and the second input vectors, the memorized multiplication result, and the memorized addition result as a first selected operand to supply the first selected operand to the first operand register input terminal 42 as the first register input operand.

In this event, the first selector S1 supplies the first selected operand to the multiplication operand register VR0 under control of the control unit 35 when the first selected operand is the multiplication operand which should be supplied to the pipeline multiplier 14. When the first selected operand is the addition operand which should be supplied to the pipeline adder 15, the first selector S1 supplies the first selected operand to the addition operand register VR4 under control of the control unit 35. The control unit 35 understands from the vector instruction whether the first selected operand is the multiplication operand or the addition operand.

Likewise, a second selector S2 is connected to the first and the second processor input buses 11 and 12, the multiplication result bus 52, the addition result bus 55, and the second operand register input terminal 46 for carrying out a second selecting operation of one of the first and the second input vectors, the memorized multiplication result, and the memorized addition result as a second selected operand to supply the second selected operand to the second operand register input terminal 46 as the second register input operand.

In this event, the second selector S2 supplies the second selected operand to the multiplication operand register VR1 under control of the control unit 35 when the second selected operand is the multiplication operand which should be supplied to the pipeline multiplier 14. When the second selected operand is the addition operand which should be supplied to the pipeline adder 15, the second selector S2 supplies the second selected operand to the addition operand register VR5 under control of the control unit 35. The control unit 35 knows from the vector instruction whether the second selected operand is the multiplication operand or the addition operand.

A third selector S3 is connected to the first multiplication operand bus 44 (of the first operand bus), the multiplication result bus 52, the addition result bus 55, and the first multiplier input terminal 17-1 for carrying out a third selecting operation of one of the first memorized operand, the memorized multiplication result, and the memorized addition result as a third selected operand and to supply the third selected operand to the first multiplier input terminal 17-1 as the first multiplier input operand. Likewise, a fourth selector S4 is connected to the second multiplication operand bus 48 (of the second operand bus), the multiplication result bus 52, the addition result bus 55, and the second multiplier input terminal 17-2 for carrying out a fourth selecting operation of one of the second memorized operand, the memorized multiplication result, and the memorized addition result as a fourth selected operand to supply the fourth selected operand to the second multiplier input terminal 17-2 as the second multiplier input operand. Supplied with the first and the second multiplier input operands, the pipeline multiplier 14 calculates the multiplication result and supplies the multiplication result to one of the result registers VR2 and VR6 under control of the control unit 35.

A fifth selector S5 is connected to the first addition operand bus 45' (of the first operand bus), the multiplication result bus 52, the addition result bus 55, and the first adder input terminal 20-1 for carrying out a fifth selecting operation of one of the first memorized operand, the memorized multiplication result, and the memorized addition result as a fifth selected operand to supply the fifth selected operand to the first adder input thermal 20-1 as the first adder input operand. Likewise, a sixth selector S6 is connected to the second addition operand bus 49 (of the second operand bus), the multiplication result bus 52, the addition result bus 55, and the second adder input terminal 20-2 for carrying out a sixth selecting operation of one of the second memorized operand, the memorized multiplication result, and the memorized addition result as a sixth selected operand to supply the sixth selected operand to the second adder input terminal 20-2 as the second adder input operand. Supplied with the first and the second adder input operands, the pipeline adder 15 calculates the addition result and supplies the addition result to one of the result registers VR3 and VR7 under control of the control unit 35.

A seventh selector S7 is connected to the first addition operand bus 45' (of the first operand bus), the second addition operand bus 49 (of the second operand bus), the multiplication result bus 52, the addition result bus 55, and the processor output bus 13 for carrying out a seventh selecting operation of one of the first and the second memorized operands, the memorized multiplication result, and the memorized addition result as the calculation result to supply the calculation result to the processor output bus 13. The control unit 35 is connected to the first through the seventh selectors S1 to S7 to control the first through the seventh selecting operations.

Figure 4:
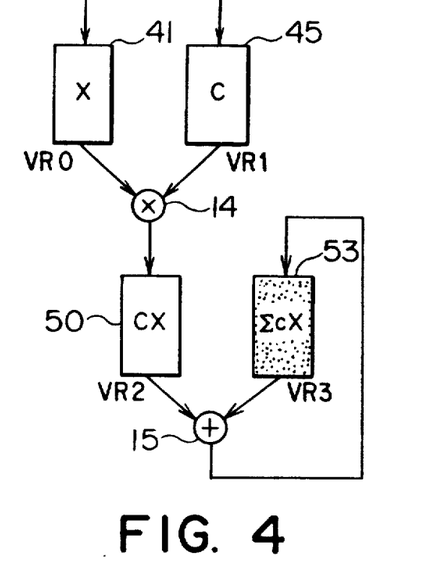
FIG. 4 is a block diagram for use in describing operation of the vector calculation unit illustrated in FIG. 2.
Figure 5:
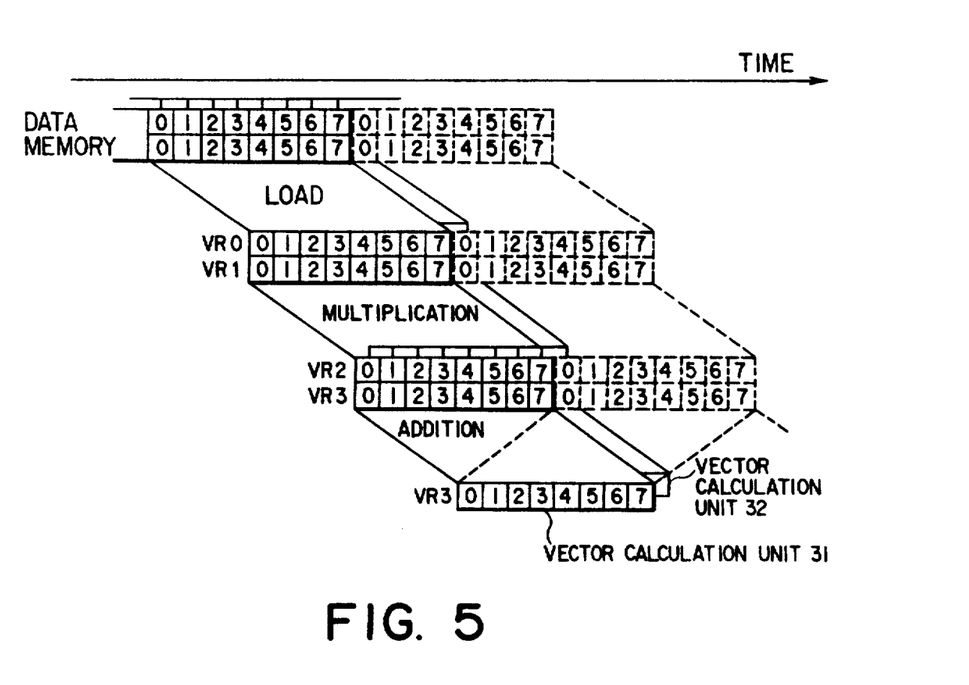
FIG. 5 is a time chart for use in describing operation of the vector calculation unit illustrated in FIG. 2.

Description will proceed to operation of the vector calculation unit 31 when the vector calculation unit 31 carries out a convolution calculation. It should be noted here that the convolution calculation is equivalent in meaning to the calculation of $$\sum_{i=0}^{n} c_i x_i,$$

where n represents a natural number and $c_i$ and $x_i$ represent vector components of the first and second input vectors, respectively. The convolution calculation is carried out in the vector calculation unit 31 in the manner illustrated in FIGS. 4 and 5. In FIGS. 4 and 5, the natural number n is equal to 7. A calculation result of the convolution calculation is held in the result register VR3 of the addition result vector register 53.

Figure 6:
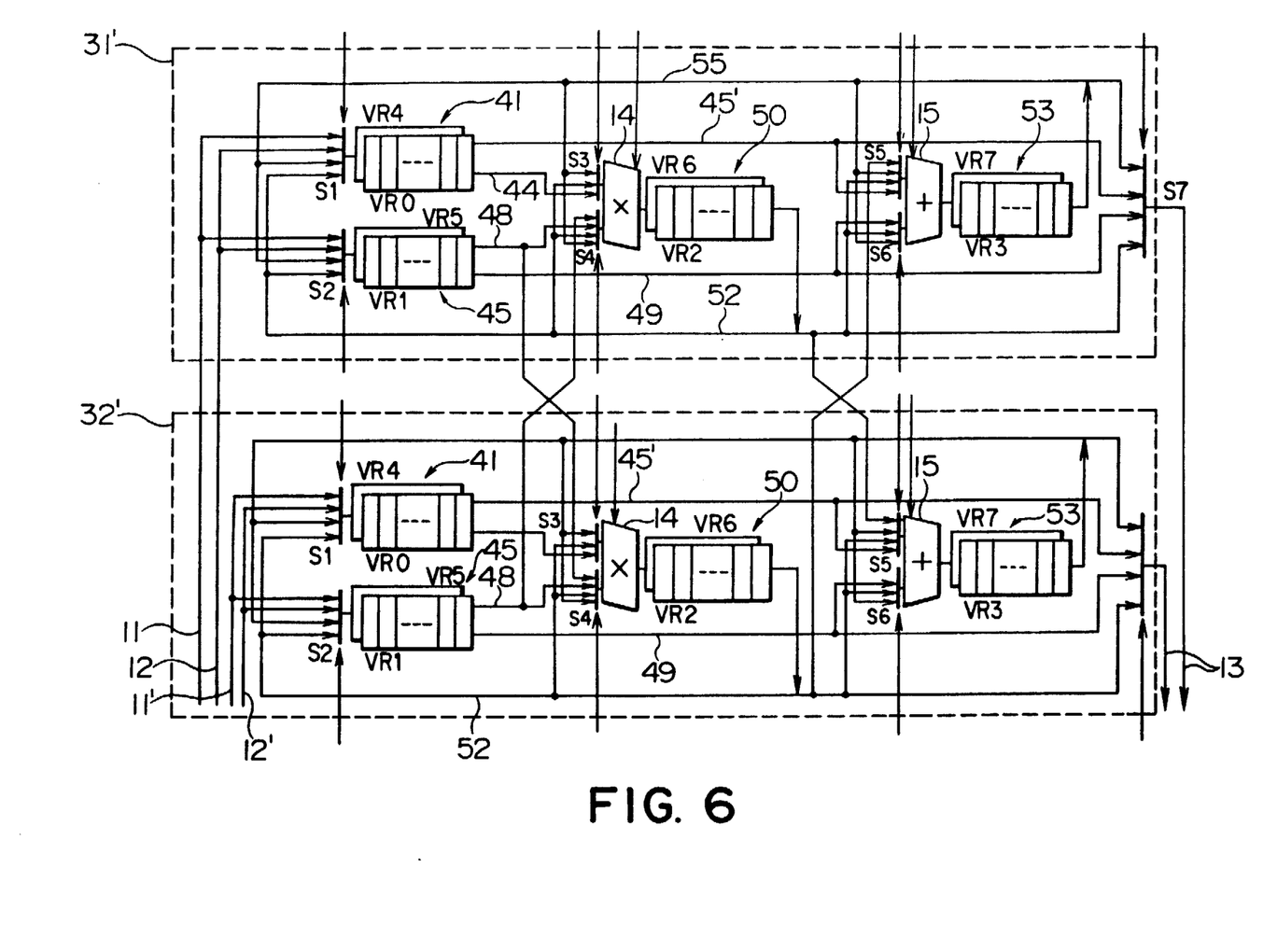
FIG. 6 is a block diagram of primary and subsidiary vector calculation units included in a vector processor according to a second embodiment of this invention.

Turning to FIG. 6, primary and subsidiary vector calculation units 31' and 32' are included in a vector processor according to a second embodiment of this invention. The vector processor has first and second primary processor input buses 11 and 12 and first and second subsidiary processor input buses 11' and 12'. The first and the second primary input buses 11 and 12 are supplied with first and second primary input vectors. The first and the second subsidiary input buses 11' and 12' are supplied with first and second subsidiary input vectors. The vector processor is for calculating a calculation result of a vector calculation in accordance with floating-point arithmetic in response to the first and the second primary input vectors and the first and the second subsidiary input vectors.

The primary vector calculation unit 31' is similar to the vector calculation unit 31 of FIG. 3 except for the following. The fourth selector S4 of the primary vector calculation unit 31' is furthermore connected to the second multiplication operand bus 48 of the second operand bus of th subsidiary vector calculation unit 32' so as to select, as the fourth selected operand, the second memorized operand memorized in the second operand vector register 45 of the subsidiary vector calculation unit 32'. The fifth selector S5 of the primary vector calculation unit 31' is furthermore connected to the multiplication result bus 52 of the subsidiary vector calculation unit 32' so as to select, as the fifth selected operand, the memorized multiplication result memorized in the multiplication result vector register 50 of the subsidiary vector calculation unit 32'.

The subsidiary vector calculation unit 32' is similar to the vector calculation unit 31 of FIG. 3 except for the following. The fourth selector S4 of the subsidiary vector calculation unit 32' is furthermore connected to the second multiplication operand bus 48 of the second operand bus of the primary vector calculation unit 31' so as to select, as the fourth selected operand, the second memorized operand memorized in the second operand vector register 45 of the primary vector calculation unit 31'. The fifth selector S5 of the subsidiary vector calculation unit 32' is furthermore connected to the multiplication result bus 52 of the primary vector calculation unit 31' so as to select, as the fifth selected operand, the memorized multiplication result memorized in the multiplication result vector register 50 of the primary vector calculation unit 31'. The control unit 35 (FIG. 2) is connected to the first through the seventh selectors S1 to S7 of the primary and the subsidiary vector calculation units 31' and 32' to control the first through the seventh selecting operations of the primary and the subsidiary vector calculation units 31' and 32'.

Description will proceed to operation of the primary and the subsidiary vector calculation units 31' and 32' when the vector calculation units 31' and 32' carry out a complex butterfly calculation. It should be noted there that the complex butterfly calculation is equivalent in meaning to first and second calculation of:

$$a_{i+1} = a_i + \omega_i b_i$$

$$b_{i+1} + a_i - \omega_i b_i$$

where a, b, and $\omega$ are complex variables.

Complex multiplication ωb is expanded to real calculation given by:

$$RE[\omega b] = Re[\omega]Re[b] - Im[\omega]Im[b]$$

$$Im[\omega b] = Re[\omega]Im[b] + Im[\omega]Re[b].$$

where RE[A] represents a real part of A and Im[A] represents an imaginary part of A.

Figure 7:
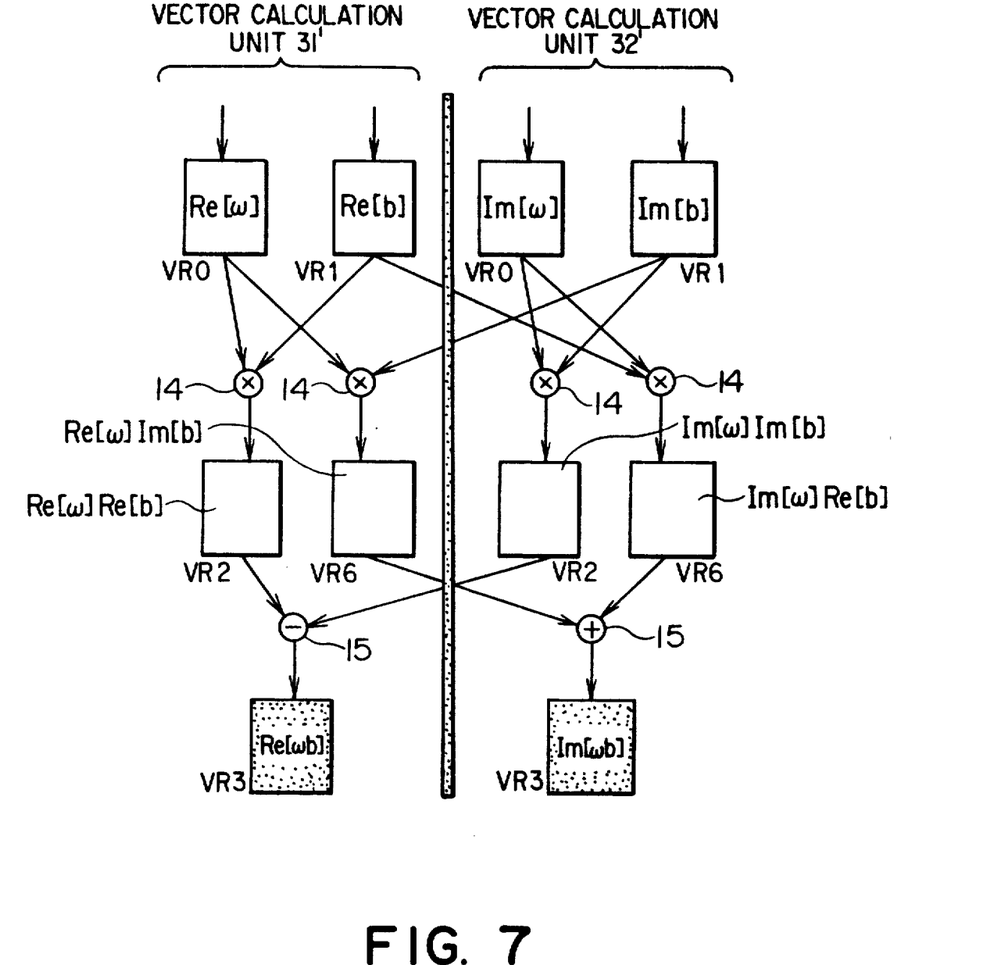
FIG. 7 is a block diagram for use in describing operation of the vector calculation units illustrated in FIG. 6.
Figure 8:
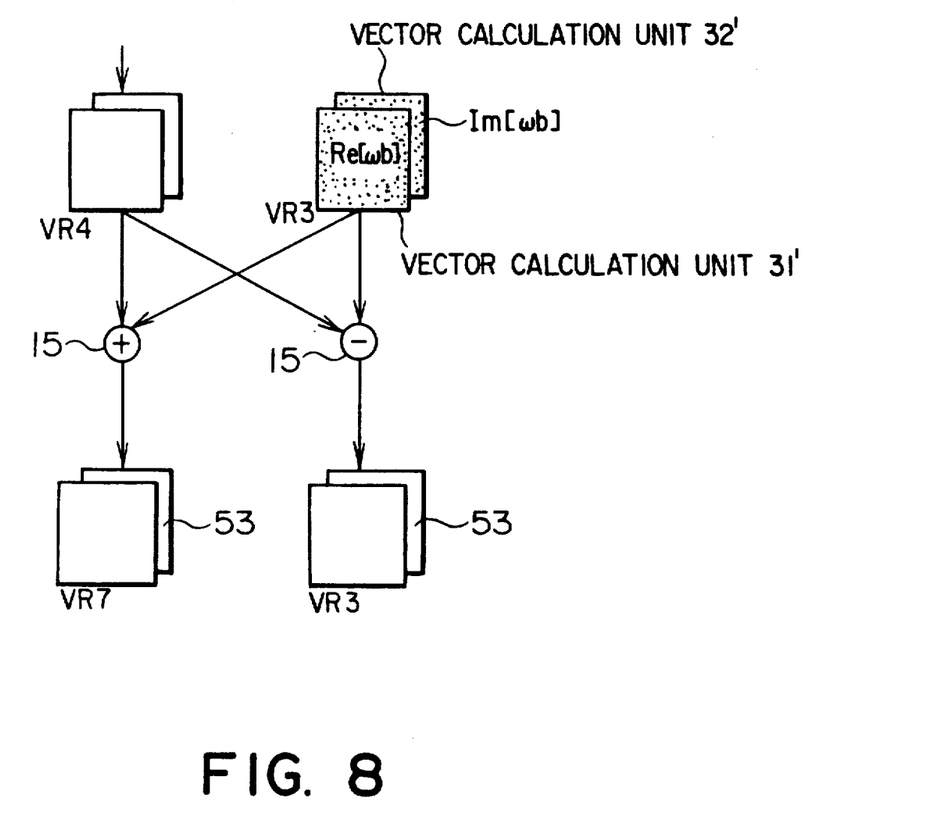
FIG. 8 is another block diagram for use in describing operation of the vector calculation units illustrated in FIG. 6.
Figure 9:
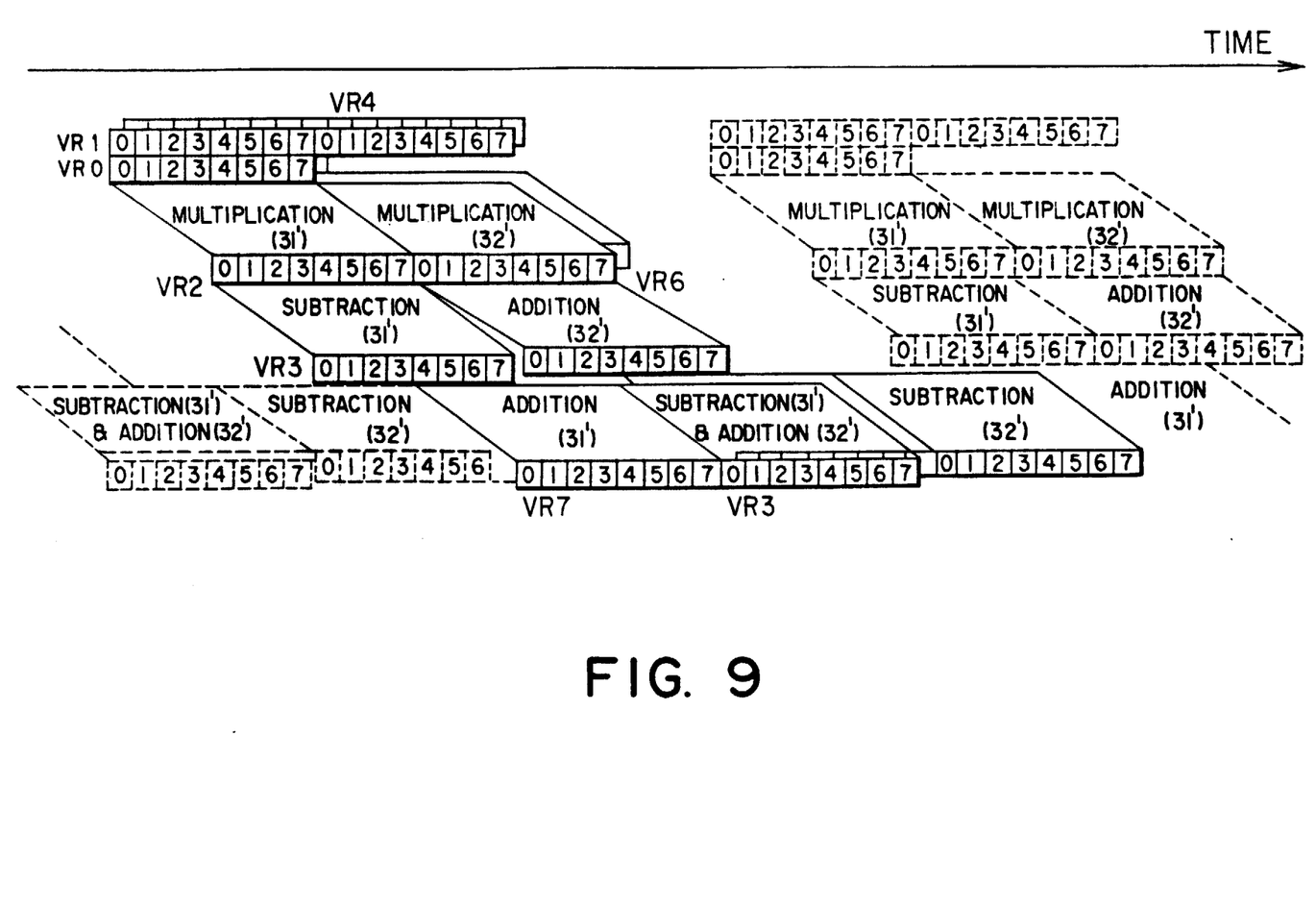
FIG. 9 is a time chart for use in describing operation of the vector calculation units illustrated in FIG. 6.

On calculating the complex butterfly calculation by using the primary and the secondary vector calculation units 31' and 32', real parts RE[ω] and Re[b] are supplied to the primary vector calculation unit 31' as the first and the second input vectors while imaginary parts Im[ω] and Im[b] are supplied to the subsidiary vector calculation unit 32' as the third and the fourth vectors. A real part RE[ωb] of a product ωb and an imaginary part Im[ωb] of the product ωb are calculated in the manner illustrated in FIG. 7. Thereafter, complex addition and complex subtraction are carried out in the manner illustrated in FIG. 8. A calculation result of the complex butterfly calculation is stored in the addition result vector registers 53 of the primary and the subsidiary vector calculation units 31' and 32'. Such operation of the primary and the subsidiary vector calculation units 31' and 32' is illustrated in FIG. 9.

While this invention has thus far been described in conjunction with a few embodiments thereof, it will readily be possible for those skilled in the art to put this invention into practice in various other manners. For example, the result registers VR6 and VR7 may be removed or omitted from the vector calculation unit 31 illustrated in FIG. 3. In this case, the pipeline multiplier 14 supplies the multiplication result to the result register VR2 without any control of the control unit 35. Likewise, the pipeline adder 15 supplies the addition result to the result register VR3 without any control of the control unit 35.

What is claimed is:

1. A vector processor comprising:
   a first processor input bus, a second processor input bus and a processor output bus;
   a vector calculation unit connected to each of said first and second input processor buses for receiving respective first and second input vector operands and connected to said output processor bus for outputting a vector calculation result; and
   control unit means connected to said vector calculation unit for controlling said vector calculation unit;
   said vector calculation unit comprising:
      first and second vector operand registers for respectively storing first and second operands;
      pipeline multiplier means for calculating a multiplication result of a floating-point multiplication in response to third and fourth operands supplied to first and second multiplier input terminals and providing said multiplication result to a multiplier output terminal;
      multiplication result vector register connected to said multiplier output terminal for temporarily storing a multiplication result calculated by said pipeline multiplier means;
      multiplication result bus connected to said multiplication result vector register to be supplied with a temporarily stored multiplication result;
      pipeline adder means for calculating an addition result of a floating-point addition in response to fifth and sixth operands supplied to first and second adder inputs and providing said addition result to an adder output terminal;
      addition result vector register connected to said adder output terminal for temporarily storing an addition result calculated by said pipeline adder means;
      addition result bus connected to said addition result vector register to be supplied with a temporarily stored addition result;
      first selector means having inputs connected to said first processor bus, said multiplication result bus, and said addition result bus and responsive to said control unit means for supplying said first operand to said first vector operand register;
      second selector means having inputs connected to said second processor bus, said multiplication result bus, and said addition result bus and responsive to said control unit means for supplying said second operand to said second vector operand register;
      third selector means having inputs connected to said first vector operand register, said multiplication bus, and said addition result bus and responsive to said control unit means for supplying said third operand to said first multiplier input terminal;
      fourth selector means having inputs connected to said second vector operand register, said multiplication bus, and said addition result bus and responsive to said control unit means for supplying said fourth operand to said second multiplier input terminal;
      fifth selector means having inputs connected to said first processor input bus, said multiplication result bus, and said addition result bus and responsive to said control unit means for supplying said fifth operand to said first adder input terminal;
      sixth selector means having inputs connected to said second processor input bus, said multiplication result bus, and said addition result bus and responsive to said control unit means for supplying said sixth operand to said second adder input terminal; and
      seventh selector means having inputs connected to said first and second processor input buses, said multiplication result bus, and said addition result bus and responsive to said control unit means for supplying said vector calculation result to said processor output bus.

2. A vector processor as recited in claim 1 further comprising:
   a third processor input bus, a fourth processor input bus and a second processor output bus; and
   subsidiary vector calculation unit means connected to said third and fourth processor input buses and responsive to said control unit means for receiving seventh and eighth input vector operands and connected to said second processor output bus for outputting a second vector calculation result, said vector calculation unit means and said subsidiary vector calculation unit means being cross-coupled so that intermediate results from respective pipeline multiplier means and pipeline adder means from one calculation unit means may be used in calculating a calculation result in another calculation unit means.

3. A vector processor as recited in claim 2 wherein said subsidiary vector calculation unit comprises:
third and fourth vector operand registers for respectively storing seventh and eight operands, said second selector means further having an input connected to said fourth vector operand register;
second pipeline multiplier means for calculating a multiplication result of a floating-point multiplication in response to ninth and tenth operands supplied to third and fourth multiplier input terminals and providing said multiplication result to a second multiplier output terminal;
second multiplication result vector register connected to said second multiplier output terminal for temporarily storing a multiplication result calculated by said second pipeline multiplier means;
second multiplication result bus connected to said second multiplication result vector register to be supplied with a temporarily stored multiplication result, said fifth selector means further having an input connected to said second multiplication result bus;
second pipeline adder means for calculating an addition result of a floating-point addition in response to eleventh and twelfth operands supplied to third and fourth adder inputs and providing said addition result to a second adder output terminal;
second addition result vector register connected to said second adder output terminal or temporarily storing an addition result calculated by said second pipeline adder means;
second addition result bus connected to said second addition result vector register to be supplied with a temporarily stored addition result;
eight selector means having inputs connected to said third processor bus, said second multiplication result bus, and said second addition result bus and responsive to said control unit means for supplying said seventh operand to said third vector operand register;
ninth selector means having inputs connected to said second processor bus, said second multiplication result bus, and said second addition result bus and responsive to said control unit means for supplying said eight operand to said fourth vector operand register;
tenth selector means having inputs connected to said third vector operand register, said second multiplication bus, and said second addition result bus and responsive to said control unit means for supplying said ninth operand to said third multiplier input terminal;
eleventh selector means having inputs connected to said second vector operand register, said fourth vector operand register, said second multiplication bus, and said second addition result bus and responsive to said control unit means for supplying said tenth operand to said fourth multiplier input terminal;
twelfth selector means having inputs connected to said third processor input bus, the multiplication result bus of said vector calculation unit, said second multiplication result bus, and said second addition result bus and responsive to said control unit means for supplying said eleventh operand to said third adder input terminal;
thirteenth selector means having inputs connected to said fourth processor input bus, said second multiplication result bus, and said second addition result bus and responsive to said control unit means for supplying said twelfth operand to said fourth adder input terminal; and
fourteenth selector means having inputs connected to said third and fourth processor input buses, said second multiplication result bus, and said second addition result bus and responsive to said control unit means for supplying said second vector calculation result to said second processor output bus.

4. A vector processor as recited in claim 1 wherein said first and second vector operand registers each comprise multiplication and addition registers, said fifth and sixth selector means being connected to said first and second processor input buses through respective addition registers and said seventh selector means being connected to said first and second processor input buses through said addition register.

5. A vector processor as recited in claim 1 further comprising data memory means connected to said first and second processor input buses for storing data representing first and second input vectors, said data memory means being addressed by said control unit means and supplying data to said first and second processor input buses.

6. The vector processor as recited in claim 1 further comprising scalar calculation unit means connected to said first and second processor input buses and responsive to said control unit means for receiving respective first and second input scalar operands and connected to said processor output bus for outputting a scalar calculation result.

* * * * *